US005221239A

United States Patent [19]

Catlett

[11] Patent Number: 5,221,239

[45] Date of Patent: Jun. 22, 1993

[54] AUTOMATIC DOOR OPERATOR WITH COMPOUND EPICYCLIC GEAR DRIVE SYSTEM

[75] Inventor: John C. Catlett, Corpus Christi, Tex.

[73] Assignee: Overhead Door Corporation, Horton Automatics Division, Corpus Christi, Tex.

[21] Appl. No.: 826,659

[22] Filed: Jan. 21, 1992

Related U.S. Application Data

[63] Continuation of Ser. No. 583,660, Sep. 17, 1990, abandoned.

[51] Int. Cl.[5] .......................... F16H 1/28; E05F 15/12

[52] U.S. Cl. ....................................... 475/342; 49/334

[58] Field of Search ........................ 475/392, 334, 335; 49/334

[56] References Cited

U.S. PATENT DOCUMENTS

| | | | |
|---|---|---|---|
| 1,799,740 | 4/1931 | Felton | 475/342 |
| 3,422,704 | 1/1969 | Catlett | 475/4 |
| 3,457,674 | 7/1969 | Catlett et al. | 49/340 |
| 4,045,914 | 9/1977 | Catlett | 49/334 |
| 4,116,293 | 9/1978 | Fukui | 475/342 |
| 4,220,051 | 9/1980 | Catlett | 49/334 X |
| 4,333,270 | 6/1982 | Catlett | 49/336 |
| 4,366,727 | 1/1983 | Jonsson | 475/342 |
| 4,599,824 | 7/1986 | Mitsuhashi et al. | 49/334 X |

FOREIGN PATENT DOCUMENTS

| | | | |
|---|---|---|---|
| 1584185 | 1/1970 | Fed. Rep. of Germany | 49/334 |

*Primary Examiner*—Rodney H. Bonck
*Assistant Examiner*—Daniel Wittels
*Attorney, Agent, or Firm*—Kalish & Gilster

[57] ABSTRACT

Door operator for commercial and domestic use with swing-mounted doors are disclosed. Each operator employs a variable-speed d.c. motor as prime mover, and a vertically oriented door-driving operator output shaft journalled in a transmission having a compact transmission housing which includes shock mounts for mounting of the transmission housing and operator within structure associated with the door. The transmission provides speed reduction coupling of the motor drive shaft to the operator output shaft with substantially right-angled relationship between their axes of rotation. The transmission includes a drive gear, to which the motor drive shaft is coupled by miter gear arrangement of different types, with the drive gear in coaxial relation with the operator output shaft but independently rotatable about it. Epicyclic sun-and-planet gear drive mechanism of specialized design is coaxial with the operator shaft and includes planet gears driven for epicyclic movement about the axis of the operator output shaft, providing speed reduction coupling of the drive gear to the output shaft. Different possible spring arrangements, including rack-gear operated spring modules of interchangeable character, are used for resiliently coupling restorative force to the operator output shaft upon rotation thereof in at least one direction.

30 Claims, 8 Drawing Sheets

FIG. 4
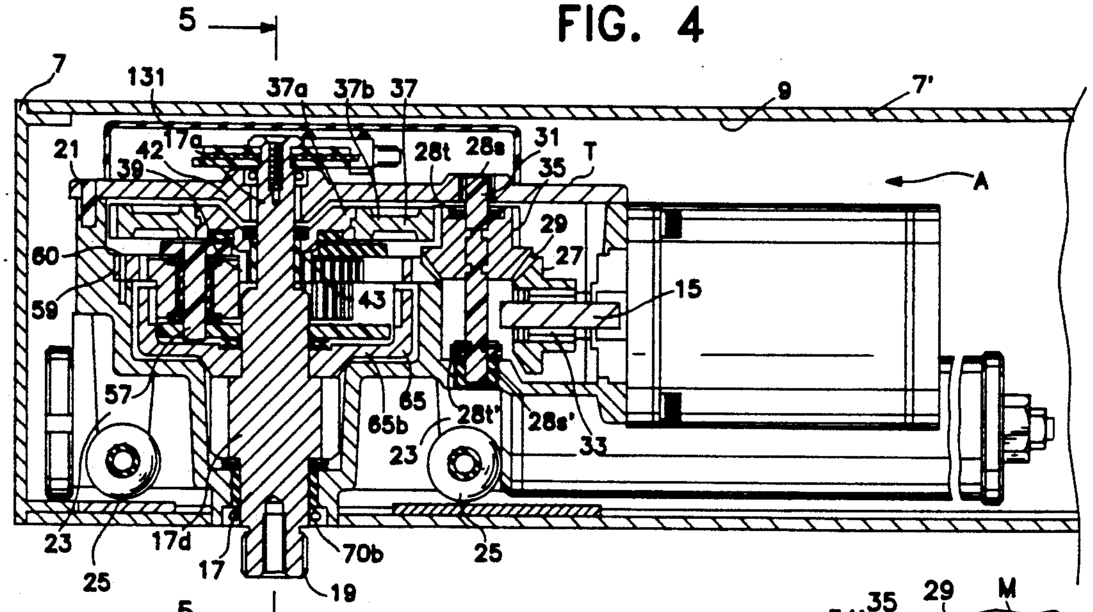
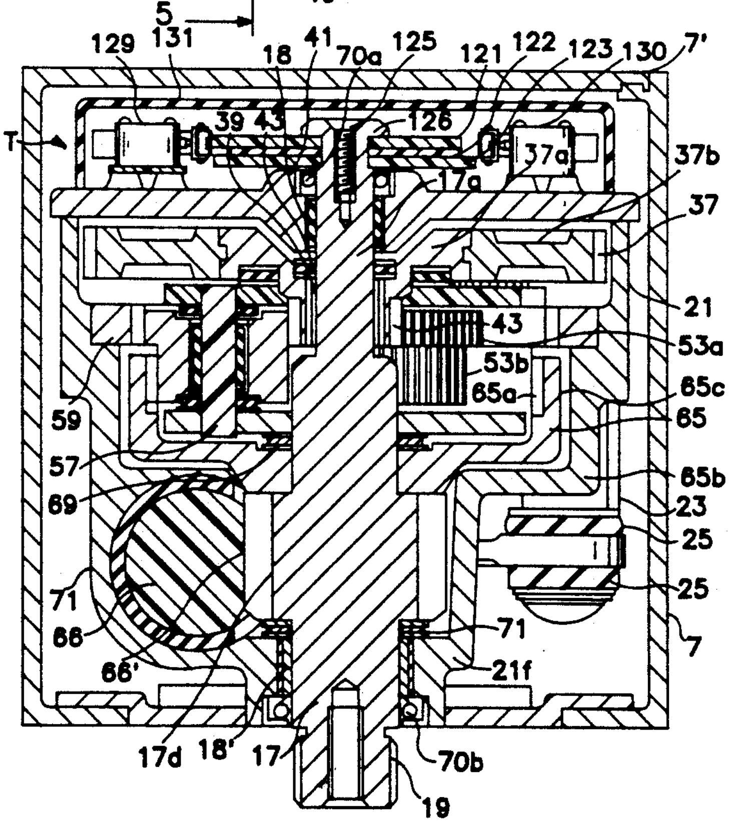
FIG. 5
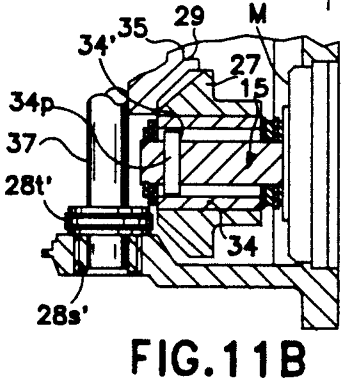
FIG.11B
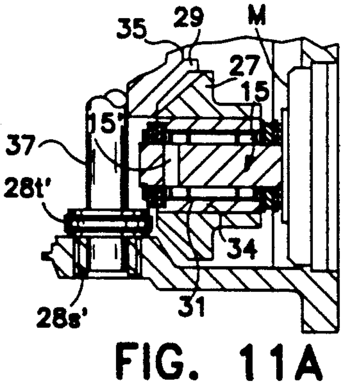
FIG. 11A

AUTOMATIC DOOR OPERATOR WITH COMPOUND EPICYCLIC GEAR DRIVE SYSTEM

This application is a continuation of appliction Ser. No. 07/583,660, filed Sep. 17, 1990 and now abandoned.

BACKGROUND OF THE INVENTION

This invention relates to door operating devices, i.e., so-called automatic door operators or actuators. More particularly, it relates to an electrically actuated door operator incorporating certain new and highly useful improvements in motion transmission systems.

In the automatic door industry, which now serves a market of world-wide scope, there has been a continuing need and effort to provide technologically innovative, more reliable, more long-lasting, quieter, more compact, more economical door operators. Because such operators must be used in a limited space of door structures for providing operation of doors strictly in accordance with specifications, and are expected or hoped to be able do so reliably for year after year, the designer must meet size and operating contraints which do not permit variation significantly from given size or operational limitations or to adopt wholly new types of movements or functions.

Rather, the designer must be able to conform a door operator to these limitations. In doing so, the designer must confront the design with a recognition of having available only a limited number of possible parameters and components which can be varied or designed to provide a superior operator design with capability of meeting specifications and satisfying ever-changing needs of the marketplace for lower cost coupled with greater longevity and better performance than existing technology.

As every door operator accordingly must include a prime mover and some sort of drive mechanism for coupling door-actuating energy from the prime mover to the door to be actuated, appliction of highly disciplined, experience-oriented design of the drive mechanism will be understood to be of paramount significance, with the most critical attention to the preselection of design philosophies and component elements, testing, and elimination of any potential for an "Achilles' heel" in a product which, once fielded, is expected to perform faultlessly, smoothly and quietly (which is to say unobtrusively) for years on end, if possible.

It has been determined that certain advantages accrue from a drive mechamism in which gearing is used to couple power from an electric motor, as the archetypical prime mover, to a door operating shaft. There are many transmission gear drive mechanisms in the prior art of door operators.

My U.S. Pat. No. 4,333,270 illustrates a door operator wherein the design included a transmission for speed reduction having a series of bevel gears with mutually perpendicular axes to drive a final pinion parallel with, and driving, the door shaft. The transmission similarly is of greater length than I now believe possible or desirable.

My U.S. Pat. No. 3,422,704 describes an automatic door operator in which I brought about a 90° relationship between the motor and door axes by using a bevel gear arrangement for rotating the door shaft, employing two simple, independent planetary gear structures in series between the motor and bevel bears for speed reduction. These planetary gear structures and a clutch mechanism provided far greater length of the overall mechanism than I now would prefer.

Other prior art gear train speed reduction mechanisms may be noted.

U.S. Pat. No. 3,457,674 although disclosing intermeshing bevel gears for 90° angle drive, shows a power transmission between the motor and bevel gears which employs a drive referred to by the trade designation "HARMONIC DRIVE." This drive mechanism, while compact, has certain inherent design limitations not suited for achieving the intended power-handling capability, reliability, compactness and performance of the present operator.

For example, U.S. Pat. No. 4,045,914 describes an operator with a four-gear speed reduction train including a ring gear carried on a shaft which latter mounts a bevel driven gear meshing with a bevel gear secured on the door driving shaft to bring about a 90° angle relationship between the axes of rotation of the driving motor and door shaft. A six-gear train of relative complexity provides for motion transmission, with speed reduction accordingly, to the bevel driving gear. A difficulty of this approach, as with comparable others of the prior art, is that a final bevel drive gear and the transmission housing is exposed to high stresses with correspondingly high wear both on the teeth and associated bearings Consequently, it is seen that there are problems with prior art door operators, such as objectionable size, too great an operating noise, high wear, and high stress, and even proneness to early failure, which not only need to be overcome but can be overcome by an operator of the present invention.

In addition to the need for obviating these problems and that of providing the 90° angle drive relationship noted, a door operator desirably also must be capable of reconfiguration to meet a wide variety of different possible door installations, where the door may swing in only one direction, or the other, or may instead be needed to swing in both directions, be powered in only one or both directions, be capable of so-called breakaway operation for safety reasons, and so forth. Such reconfiguration of the door operator for these different kinds of door installations should be facile and economic, without requiring wholly new or different mechanisms for each possible installation. Accordingly, the door operator should be universally adapable. It should also easily permit adjustments for precise variation in closing and opening limits of movement, as may be dictated by a specific installation.

My above-noted U.S. Pat. No. 4,333,270 illustrates use of a module of interchangeable character although in a door operator employing an intermeshed bevel gear for bringing about the above-described 90° axial relationship, and a subsequent train of gears and pinions, with the difficulties of a relatively long transmission with a housing extending along the gear train.

SUMMARY OF THE INVENTION

Among the objects of the present invention are to provide an extremely compact automatic door operator (herein referred to as a door operator, or simply, operator) for achieving a new level of capability and performance with ability not only of meeting myriad door operator specifications but intended to satisfy the marketplace needs for reliability and longevity, thus achieving better performance than existing technology at lower relative cost than other operators, while attaining also unparalleled universality of design.

Among related objects of the invention may be noted the provision of such a door operator which achieves a new standard in quiet, smooth operation, through use of power transmission components and design for more efficiently coupling power to an output shaft of the operator with reduced stresses and associated gear noises.

It is one of the specific objects of the invention to provide such an operator which utilizes a methodolgy of coupling a prime mover to a door which achieves a very high mechanical advantage in an extremely compact mechanism wherein forces are coupled to a door operating shaft in a balanced manner by the use of multiple gears for distributing forces and reducing stresses involved in the operation thereof.

It is, as well, an object of the invention to bring about such an operator of compactness that permits the operator to be received within a relatively small housing, as for example, to make the operator useful with swinging doors of the type which have not been suited for automatic operator actuation before now.

It is indeed also an object of the invention to bring about an operator of such compactness and yet of such good performance, high reliability and low cost that it can be used in domestic installations in which operators have never been used for reasons of impracticality, size or cost.

Another object of the invention is that of providing a door operator of the character stated which assures of integral and positive relationship between its components for achieving high structural strength and reliability previously unavailable or impractical, both for the operator housing and its components, without "weak link" relationships sometimes characteristic of the prior art.

Another object of the invention is to provide such a door operator having good load-carrying and load-handling characteristics including not only the capability of driving doors under heavy static load but also handling relatively great dynamic loading.

The invention has as a further object to provide a door operator which permits quick, economic, facile assembly and installation, as a finished unit, as well as ease of disassembly and reassembly for inspection or like purposes if ever needed.

Briefly, a door operator of the present invention, as for use with swing-mounted doors comprising a prime mover, a door-driving operator output shaft, and means for coupling the operator output shaft to the door to be operated thereby, with the operator output shaft rotatable about a vertical axis for corresponding movement of the door. The prime mover, which may be an electric motor of variable-speed type, has a drive shaft and is controllably energized for rotation of the drive shaft. A transmission for speed reduction provides coupling of the motor drive shaft to the operator output shaft with substantially right-angled relationship between the axes of rotation of the operator output shaft and motor drive shaft. The transmission is of compound epicylic design. It includes a case for housing the transmission components including compound epicyclic mechanism. The operator preferably includes means for shock-mounted installation of the transmission case and operator within structure associated with the door. The transmission more specifically comprises, in one form, a first miter gear, preferably of synthetic resin material, which is driven by the prime mover drive shaft, and a second miter gear, also preferably of synthetic resin material is in substantially right-angle relationship with and is in mesh with the first miter gear for being driven by it. The transmission includes a pinion gear, also preferably of synthetic resin material, carried by the second miter gear, but carried directly by the motor drive shaft in another version of the operator, for meshing with a drive gear in coaxial relation with the operator output shaft but independently rotatable thereabout, the drive gear being preferably also of synthetic resin material, a sun pinion gear carried by the drive gear in coaxial relation with the operator output shaft but independently rotatable thereabout, a planetary cage assembly comprising a plurality of planet gears and a plate serving as means for carrying the planet gears in planetary relationship about the operator output shaft but independently rotatable thereabout with epicyclic movement, with a first portion of each of the planet gears in mesh with the sun pinion gear, a fixed ring gear carried in non-rotatable, fixed relation to the transmission housing and in coaxial relation with the operator output shaft, the fixed ring gear carrying teeth on an inside diameter thereof in mesh with the first portion of each of the planet gears, whereby rotation of the sun pinion gear causes the planet gears each to rotate not only upon its respective axis but also to revolve with epicyclic movement about the operator output axis, a pinion gear assembly comprising a moving ring gear carrying carrying teeth on an inside diameter thereof in mesh with a second portion of each of the planet gears, whereby epicyclic movement of the planet gears will provide driving engagement of the the moving ring gear, and means coupling the moving ring gear in rotationably fixed relation to the operator output shaft for driving engagement thereof. The operator further comprises means operatively associated with the operator output shaft for resiliently coupling restorative force to the operator output shaft upon rotation thereof in at least one direction.

Other objects and features will be apparent or are pointed out in the description following a description of the drawings.

BRIEF DESCRIPTION OF THE DRAWINGS

FIG. 4 is a vertical longitudinal sectional view taken along line 4—4 of FIG. 2.

FIG. 5 is a vertical transverse sectional view taken along line 5—5 of FIG. 4.

FIGS. 11A and 11B are partial cross-sections of certain motor coupling assemblies.

Corresponding reference characters indicate corresponding parts throughout the several views.

DESCRIPTION OF THE PREFERRED EMBODIMENTS

Figure 1:
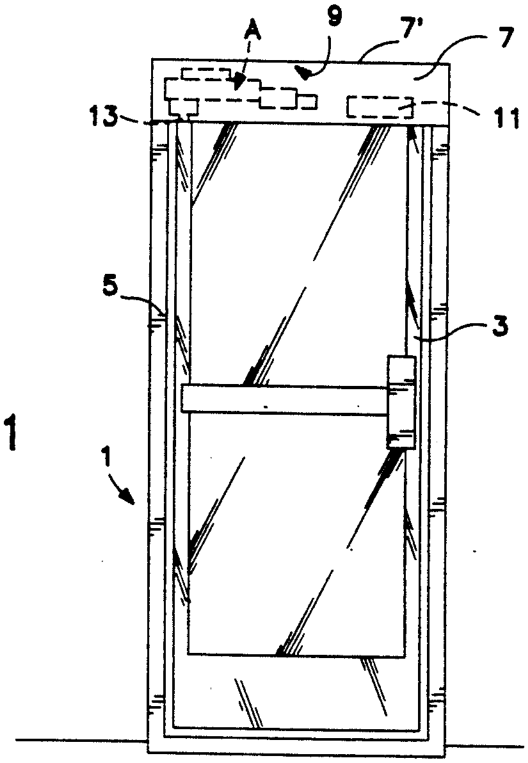
FIG. 1 is a front elevational view of a door assembly including a door, the frame in which it is spring-mounted, and a header in .which a door operator of the invention is mounted for operating the door.

Referring now by reference numerals to the drawings, FIG. 1 shows a door assembly generally designated 1 having a swingable door 3 which is hinged at its left side in a frame 5 which provides a header 7 including a cover 7' and providing an enclosure with internal space 9 for receiving an operator of the invention, as outlined in phantom at A. The door is but one possible type to be opened and/or closed by the operator, as for example automatically in response to a control 11 suitably triggered by a proximity sensor (not shown) in the form of a mat switch, infrared, photoelectric, radar or sound sensor or other device of known type. For this purpose, operator A is coupled to the upper end of a vertically-oriented door shaft 13 on which door 3 pivots. Other hinged or swinging type doors, including center-pivot types, having such a door shaft can be operated by operator A.

Figure 2:
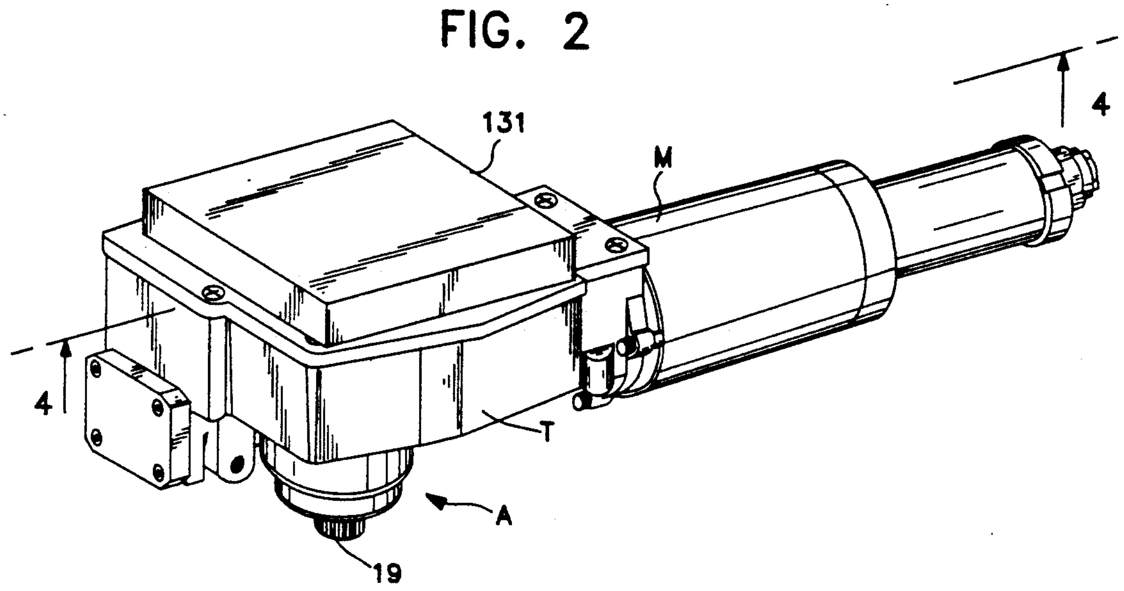
FIG. 2 is a perspective view of the door operator, as constructed in accordance with a first embodiment of the invention.

Referring to FIGS. 2, 4 and 5, M indicates a direct current, permanent magnet motor, namely of speed variable type, for serving as the prime mover of the operator, to be energized in known manner by control 11. The motor has an output shaft 15 driven accordingly, as for opening movement of the door in response to proximity to the door, and timed closure thereof after a pedestrian has passed through the door. Motor M is oriented so that, when operator A is installed horizontally as in a normal installation indicated, motor shaft 15 is horizontal.

Transmission T contains mechanism in accordance with the new design for speed-reduction coupling of door shaft 13 to motor shaft 15 by means of a door-driving output shaft 17 having a splined coupling 19, with 90°, non-intersecting relationship between the axes of rotation of operator output shaft 17 and motor drive shaft 13.

A metal case 21 of transmission T compactly houses the transmission components. Transmission case 21 has at its lower end suitable securements and projections, as at 23, serving as means for attachment of flexible shock mounts 25 of grommet type for isolation of the transmission case in a manner known per se.

Referring to FIGS. 4 and 5, operator shaft 17 is journalled at its upper and lower ends by bearings 18, 18' carried respectively by the transmission case cover 21*c* and a floor extension 21*f*. Designated at 27 is a first miter gear carried and driven by motor shaft 15. Miter gear 27 is in mesh with a second miter gear 29 in 90° relationship with the first miter gear, and is carried upon a shaft 31 journalled in needle bearings 28*s*, 28*s*' with associated needle thrust bearings 28*t*, 28*t*' at its upper and lower ends by case 21.

Preferably, both miter gears 27, 29 are formed by of a synthetic resin material of commercially available type heretofore known to be useful for gear mechanisms and which has been found to provide both a long life and low noise functions desirable in the present operator, with the resin material being molded upon a steel insert.

Miter gear 29 is thus formed by molding upon shaft 31. Depending upon usage of the operator, miter gear 27 is connected to motor shaft 15 in different possible ways. Referring momentarily to FIG. 11A, an overdrive, one-way clutch 33 is axially fitted onto motor shaft 15 to couple the shaft to a sleeved hub 34 upon which miter gear 27 is molded, for installations where the operator is to be used for single-acting operation, i.e., where door 3 is to be driven for movement only in one direction of rotation. In such usage, forced or panic movement of the door produces overrunning of pinion 27 on shaft 15, so that the door may freely open without damage to the operator. If the operator is, however, to be used for a double-acting installation, i.e., where door 3 is to be driven in different directions of rotation, it is preferred to use direct connection to shaft 15 of miter gear 27. Referring to FIG. 11B, hub 34 of pinion 27 is pinned to motor shaft 15, which for this purpose is provided with a pin 34*p* receivable through a transverse bore 15' (FIG. 4A) located proximate the outer end of the motor shaft, where the bore does not interfere with a one-way clutch if used. Such pin 34*p* engages a keyway 34' of sleeve 34 if the pinion 27 is of the configuration to be used for direct drive relationship. Of course, if a one-way clutch is to be used, as at 33, then such pin is not employed. The arrangement thereby provides means for universally adapting the motor shaft selectively for either direct drive coupling or one-way coupling to the miter gear, and so the motor has a universal character with the ability to use two different operating miter gears, namely pinion 27, on the same shaft, being thus either direct-coupled for direct driving by the motor of pinion 27 or else coupled with one-way driving relationship.

Referring again to FIGS. 4 and 5, at the upper end of miter gear 29, there is defined a pinion gear 35, also molded of such synthetic resin material, being thus carried by the second miter gear. In mesh with pinion gear 35 is a drive gear 37. Drive gear 37, with helical teeth, is in coaxial relationship with operator output shaft 17 but is independently rotatable about such shaft by virtue of being journalled by a needle bearing 39 about an upper, reduced diameter portion 17*a* of the operator output shaft.

Drive gear 37 is preferably of two-part configuration, including a hub portion 37*a* which is journalled by the above-described needle and needle thrust bearings and an outer, peripheral portion 37*b* which carries at its outer periphery teeth which mesh with pinion gear 35.

Below hub portion 37*a* is a needle thrust bearing 41 and, between hub portion 37*a* and the corresponding, proximate portion 42 of transmission case 21 is an upper needle thrust bearing 43.

Preferably, portion 37*b* is formed in place upon hub portion 37*a* to maintain an integral relation therewith. Hub portion 37*a* of the drive gear defines, and thus carries, at its lower end a sun pinion gear 44.

Figure 6:
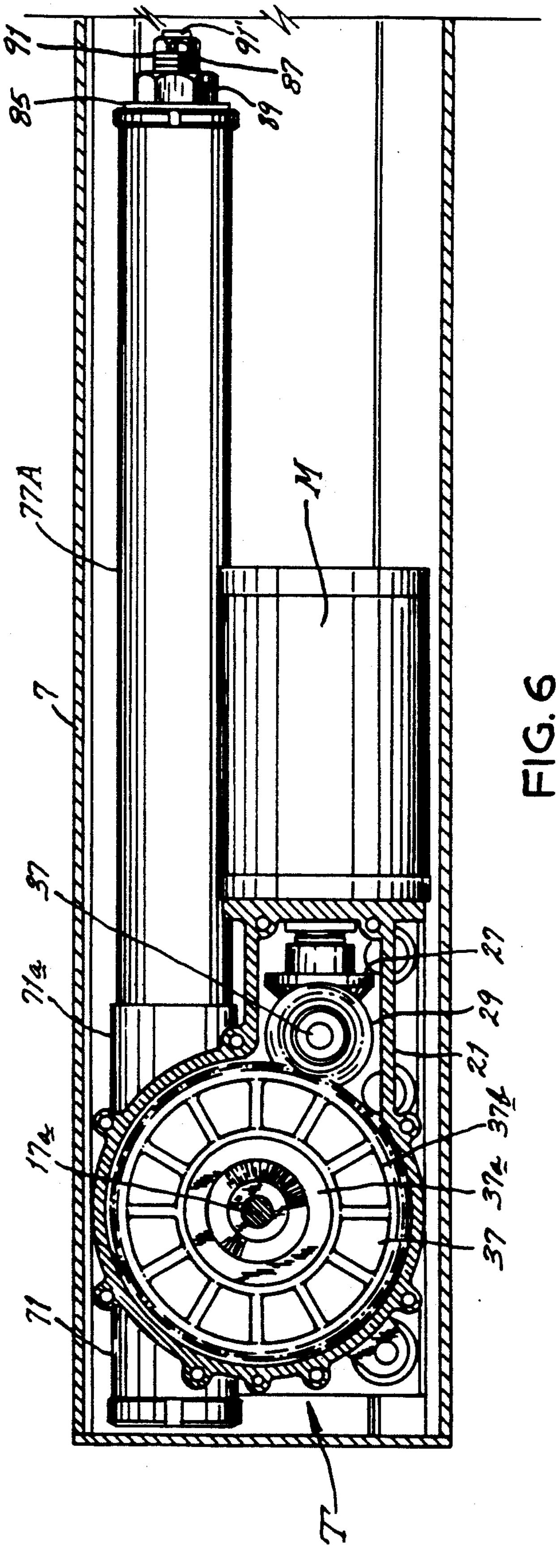
FIG. 6 is a horizontal transverse sectional view of the first version with cover removed and without showing certain control features but illustrating a certain spring module or assembly.

As will be apparent from FIG. 6, the axis of shaft 31 for pinion gear 35 and miter gear 29 which carries it is parallel to the axis of rotation of output shaft 17, but is laterally offset. The axes of output shaft 17, miter gear shaft 31 and motor shaft 15 are not in the same plane; and the axis of motor shaft 15, although in 90° relationship with the axis of output shaft 17, is in nonintersecting relationship with that of output shaft 17. Consequently, by such design, motor M is laterally offset advantageously, being thereby located to extend with its outer edge approximately in alignment with one side of transmission case 21, i.e., the front side as oriented in the drawings, all for purposes presently appearing.

Sun pinion gear 39, as thus carried by drive gear 37, is also in coaxial relation with operator output shaft 17 but is independently rotatable thereabout. It is in mesh with certain planet gears of a planetary cage assembly designated generally 45, which is depicted in FIGS. 9*a*, 9*b* and 10.

Figure 9A:
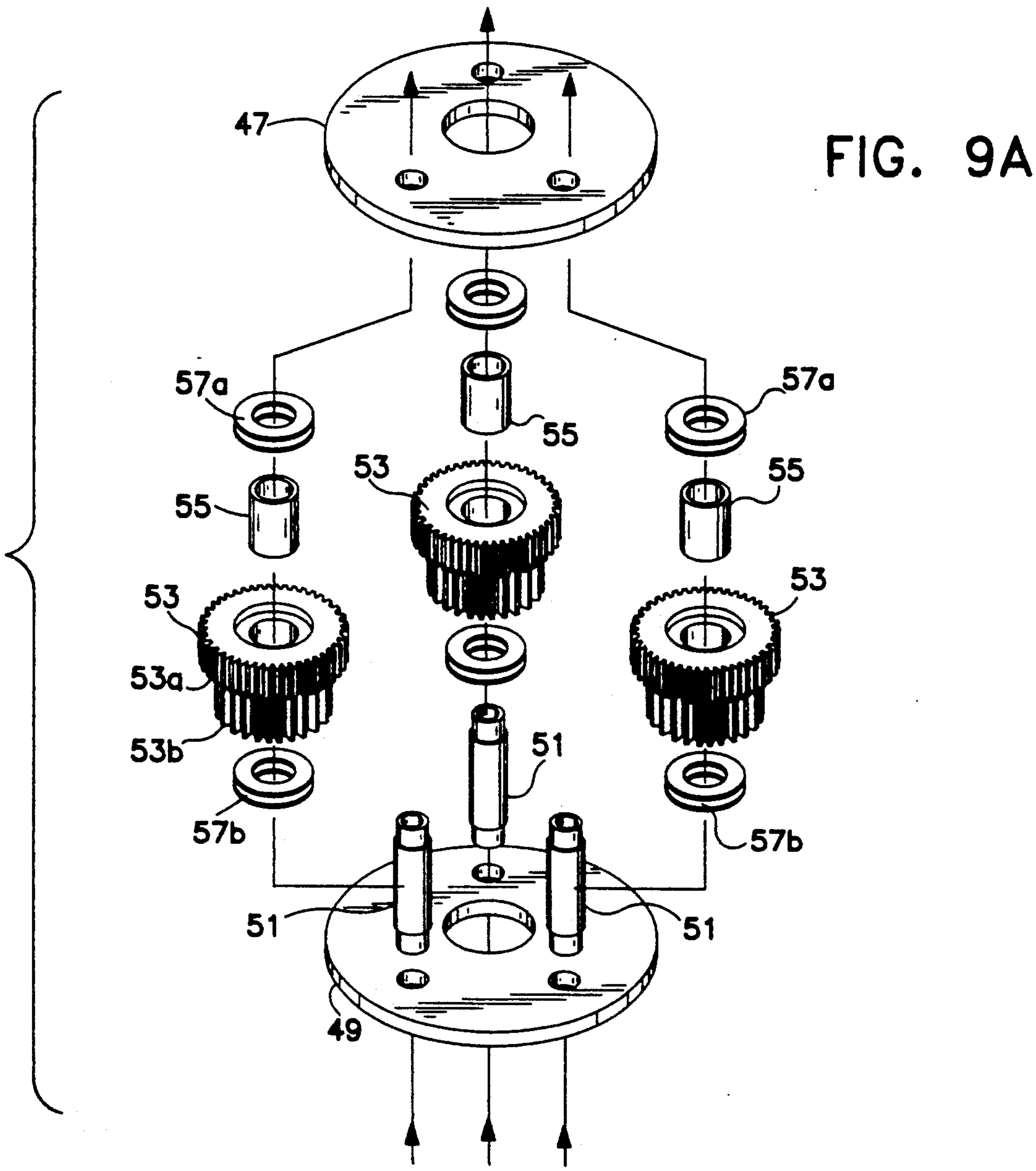
FIG. 9A is exploded assembly view of a certain planetary cage assembly.
Figure 9B:
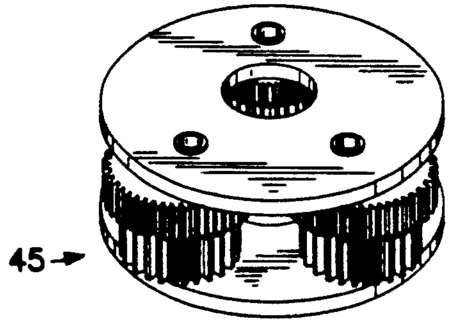
FIG. 9B is a perspective view of the assembled planetary cage assembly.

Referring accordingly to FIG. 9A, planetary cage assembly 45 comprises a planet assembly top plate 47, a planet assembly bottom plate 49 and three planet gear shafts 51 carried in equally spaced relationship, upon the same radius, between the upper and lower plates 47, 49. Carried on such shafts are three corresponding planet gears 53, each of identical construction. The planet gears, as carried by the planet gear shafts for epicyclic movement about the operator output shaft 17 independently of the output shaft, have identical configuration. Each planet gear 53 has a first portion 53*a* in mesh with the sun pinion gear 39, and a second portion 53*b* of lesser diameter. Each planet gear is journalled on its shaft 51 a respective needle bearing 55. Upper and lower needle thrust bearing 57*a*, 57*b*, respectively, provide extremely low-friction relationship with the upper and lower plates 47.

The upper portion 53*a* of each planet gear is also in mesh with teeth carried on an inside diameter of a fixed ring gear 59 which is fitted into transmission case 21, and suitably pinned in place by pins as at 60 so as to be carried in nonrotatable, fixed relation to the transmission housing, but in coaxial relationship with operator output shaft 17. Rotation of each sun pinion gear causes the planet gear not only to turn about its respective axis defined by each planet gear shaft 51 but also to revolve with epicyclic movement about the axis of operator output shaft 17.

Figure 10:
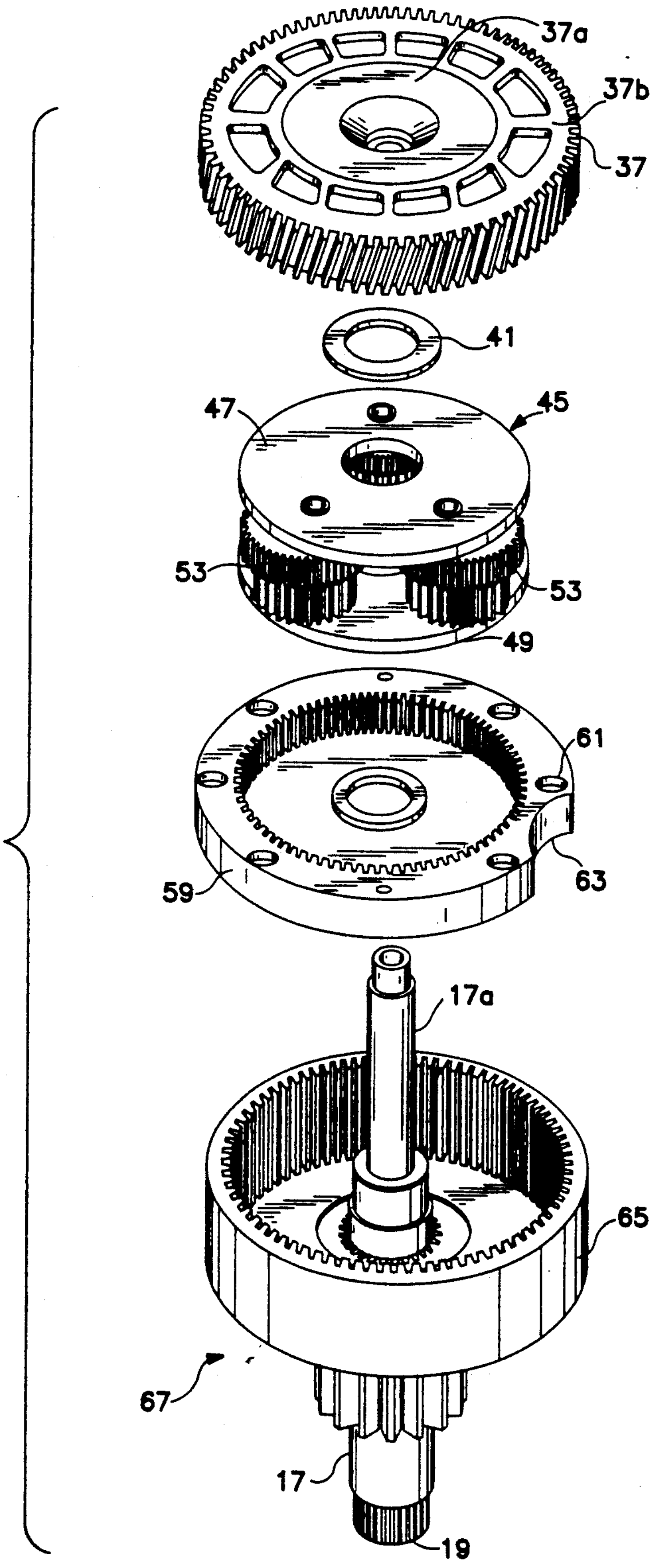
FIG. 10 is an exploded assembly view of a group of axially common elements of the operator, namely (from bottom) the pinion gear assembly, a fixed ring gear with needle thrust bearing, the planetary cage assembly, a further needle thrust bearing, and a plastic drive gear and sun pinion gear.

Referring to FIG. 10, fixed ring gear 59 is seen to be of annular configuration, but provided with apertures 61 spaced around its periphery for pinned securement to the transmission case, as described. A notch 63 engages a corresponding projection of the annular space defined for the ring gear within transmission case 21 or housing 21.

Figure 7:
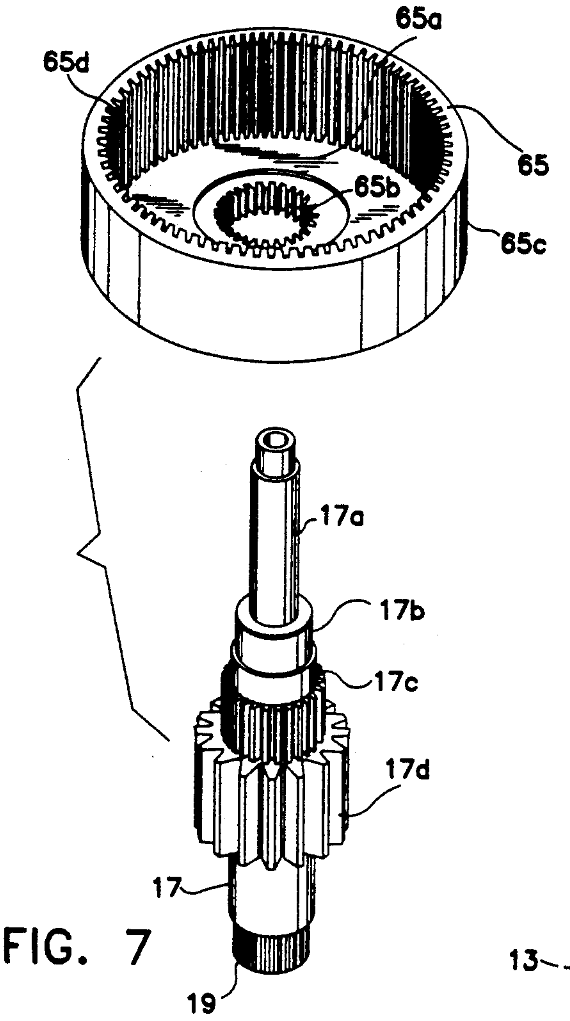
FIG. 7 is an exploded view of a certain moving ring gear and a certain pinion gear and drive shaft.
Figure 8:
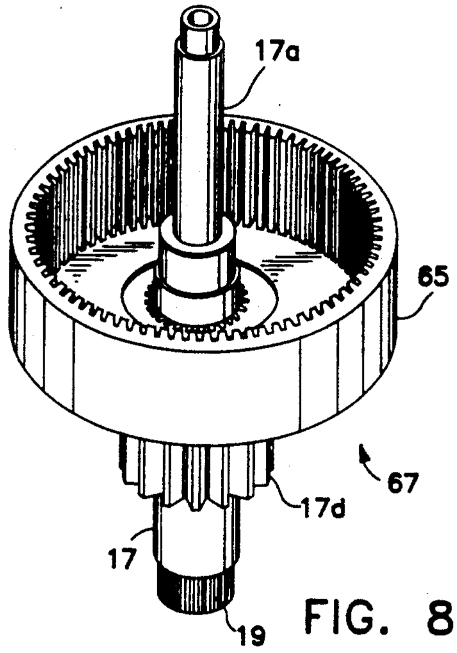
FIG. 8 is an assembly view, showing the moving ring gear, pinion gear and drive shaft in assembled condition, and termed for this purpose a pinion gear assembly.

Referring now also to FIGS. 7 and 8 (first sheet), the configuration of output shaft 17 should be understood more clearly. It includes not only said upper extension 17*a*, but also an intermediate portion 17*b* provided in its lower extremity with splines 17*c*. The splined part 17*c* receives a moving ring gear 65 including a hub 65*a* having a splined central recess 65*b* to be received by output shaft splines 17*c*. An upstanding, annular rim 65*c* is provided along its inner periphery with teeth 67*d* for meshing with the lower part 53*b* of each of the planet gears. From this it will be understood that epicyclic rotation of each of the planet gears in the manner described above will cause driving engagement of ring gear 5 with corresponding rotation of output shaft 17, with consequent driven movement of door 3. Below its splined part 17*c*, the operator output shaft is machined to provide an output shaft pinion 17*d* to be used for driving a horizontal rack gear 66 for purposes explained below.

FIG. 8 demonstrates the joined relation of output shaft 17 and moving ring gear 65 as a subassembly, designated generally 67, forming part of the overall assembly of FIG. 10. Intermediate splined portion 17*c* and planet assembly bottom plate 17 is a further needle thrust bearing 68. A still further needle thrust bearing 69 is provided at the lower end of the operator output shaft, which is otherwise journalled by a roller bearing as at 70*a* (FIG. 5) at the upper end of the operator output shaft 17 where it passes through the corresponding upper and lower walls of transmission case 21.

Pinion portion 17*d* of the operator output shaft serves with rack gear 66 and certain spring modules (to be described) to provide means for resiliently storing energy to provide a restorative force to operator output shaft 17 upon its rotation in at least one direction. For example, if the operator shaft is driven by motor M in the direction for opening the door, it is desired to store energy in a spring for providing a restorative force to back-drive shaft 17 in the opposite direction for closing the door.

Figure 13:
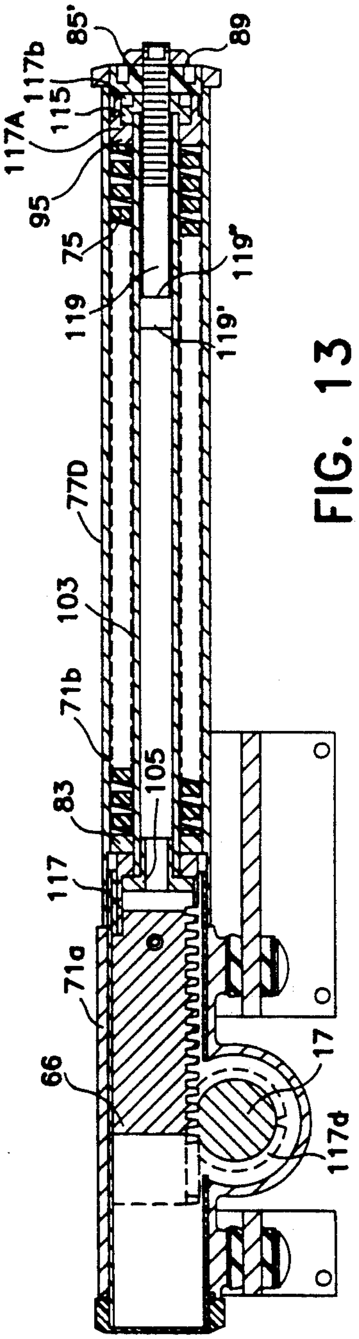
Figure 14:
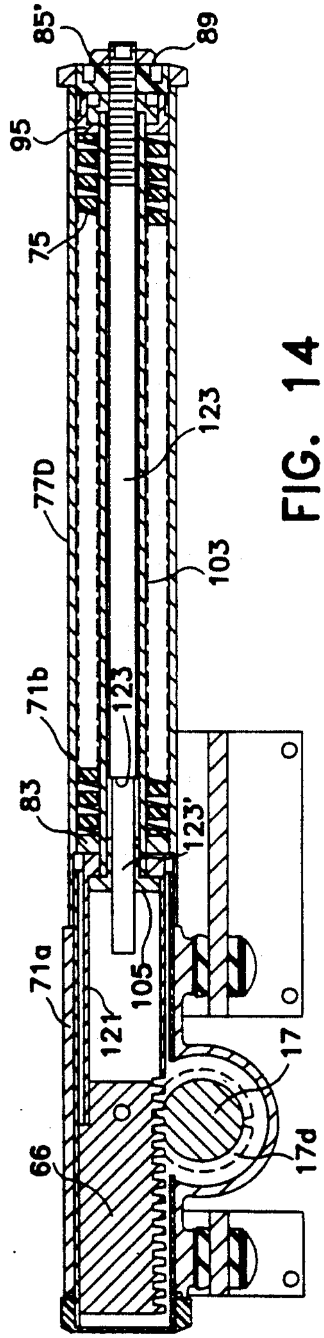

Specifically, pinion 17*d* engages rack gear 66 (FIG. 5) which is partially circular in section and has teeth 66' in mesh with pinion 17*d*. Rack gear 66 is journalled within a partly cylindrical housing 71 from which extends a spring module 77A which is but one of several possible different such spring modules. Others are designated 77B (FIG. 12), 77C (FIG. 13) and 77D (FIG. 14) which serve to illustrate various possible modifications thereof.

In each of these spring modules, a coiled compression spring 75 (see FIGS. 12, 13, 14) is maintained in a pretensioned condition, and rack gear 66 is shifted upon rotation of shaft 17 to couple further energy into the spring, and so increasing the tension of the spring in response to operator output shaft rotation, and so that the spring accordingly will provide through the rack gear restorative force to the operator output shaft for rotation in the other direction. Such operation of spring 75 and its associated mechanisms, including various adjustment features, are characteristically part of the respective spring module, each of which is of readily changeable character so that the basic operator transmission, motor and components can be configured for a specific installation by the use of an appropriate module.

Figure 12:
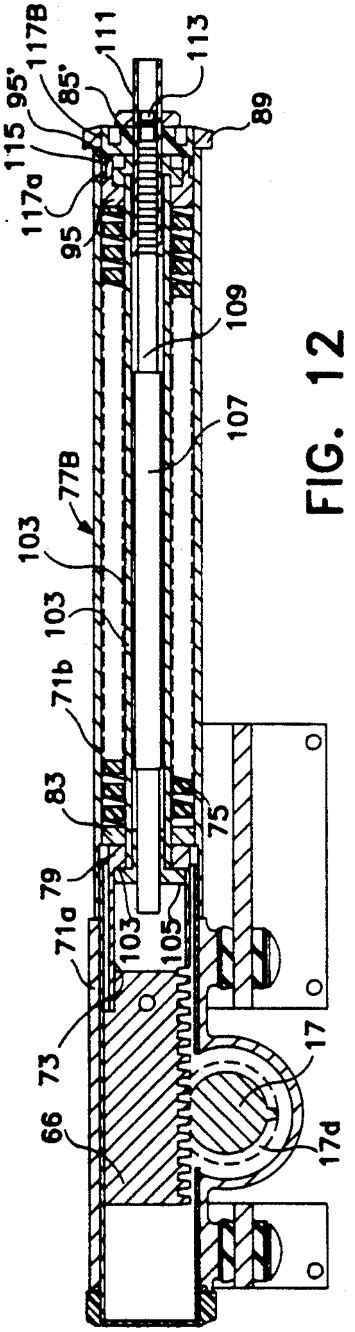
FIGS. 12, 13 and 14 are horizontal transverse sectional views of certain spring modules.

The spring module version illustrated in FIG. 12 serves to illustrate features common to each of such spring modules, There, observe that spring 75 has one end interconnected by an operating rod 73, which is of tubular character, with rack gear 66. Housing 71 comprises a first portion 71*a* formed as an extension of transmission case 21 and a second, tubular portion 71*b* extending from portion 71*a*, and joined to it, said housing portions 71*a*, 71*b* together orienting spring 75 coaxial with the longitudinal axis of shifting movement of rack gear 66.

Referring now also to FIG. 6 as well as FIG. 12, spring module 77A is of a type suited for single-acting operation by operator A of door 3 for driving it open only in one direction. In such module the rack gear by such an operting rod (as shown in FIG. 12) is urged suitably against a collar 79 which presses against a sleeve 83 serving as a base or seat for the left end of spring 75, so that any shifting to the right of rack gear 66 by clockwise rotation of output shaft 17 will compress spring 75 still further. At the opposite end of housing portion 71*b* there is fitted a plug 85 in which is threadably received an adjustment sleeve 87 held in place by a lock nut 89. Within sleeve 87 is threaded a rod 91 including a screwdriver slot 91' for stop adjustment purposes. An inner end of rod 91 (not shown) can provide adjustable abutment against an annular seat (as shown 95 in FIG. 12) upon which the outer end of spring 75 is seated, and so the relative position of elements 89, 91 may adjust the closing position of the door, with spring 75 maintained in its pretensioned state with preloading of several hundred pounds for closing of the door upon further compression of the spring resulting from shifting rightward of rack gear 70. A relatively high spring rate, such as 130 lbs/inch is highly desirable for this purpose.

Spring module 77B shown in FIG. 12 exemplarily provides capability for double-acting two-way operation. For these purposes, operating rod 73 includes for its outer end 79 an inwardly-flanged outer shoulder portion 103 in which is received a flanged stop 105 which is fitted about and secured to the inner end of a rod 107 extending from the opposite end of the module, being formed as an enlarged diameter extension of a threaded stop adjustment rod 109 threaded into a sleeve 111 which is in turn threaded into a modified plug 85', and secured by lock nut 89. A lock-screw 113 is also theaded into sleeve 111 for maintaining the position of rod 109. It is observed that seat 95 has a outward extension 95' which extends toward plug 85'. A member 115 proximate outer spring seat 95 and plug 85' completes the assembly, but snap rings 117*a*, 117*b* are also used; snap ring 117*a* interengages seat 95 and the outer end of rod 103, while snap ring 117*b* interengages seat extension 95' and member 115.

From the arrangement of parts of version 77B, it is readily understood that rightward shifting of rack gear (through clockwise driven rotation of shaft 17), compresses spring 75 by rightward shifting of spring seat 83, with return of the energy thus stored producing opposite movement for door closing until seat 83 again contacts stop 105, but leftward shifting of rack gear (through counter-clockwise driven rotation of shaft 17), compresses spring 75 by leftward shifting of spring seat 95, in response to movement of operation rod 103. Return of the energy drives the rod rightward until seat 95 again contacts member 115*a* thus stored producing closing of the door Rod 107 has an inner end 107' in relative proximity to rack gear 66, serving as a stop for righthand shifting of the rack gear corresponding to the limit of rotation of shaft 17 when driven clockwise. Also, sleeve 111 is formed with a major portion of its outside diameter slightly reduced to provide a seat 111' proximate its inner end, as a stop for lefthand shifting of the rack gear corresponding to the counterclockwise limit of rotation of shaft 17, upon being engaged by member 115, which has its inner diameter closely matched to the reduced diameter portion of sleeve 111 so that member 115 cannot ride past seat 111'.

For module version 77C (FIG. 13), single-acting, left-hand operation is provided by an arrangement in which rod 103 is interengaged with the rack gear by a tubular member 117 having an inwardly enlarged outer portion 117' peripherally engaging rod 103, which is provided with member 105 as in version 77B, and whereby leftward shifting of the rack gear will draw rod 103 toward the inner end of the module housing portion 71*b*. For this purpose, snap ring 117*a* interengages seat 95 and the outer end of rod 103, while snap ring 117*b* interengages seat extension 95' and member 115. To provide an adjustable stop, a rod 119 is threaded into base 85' and has an increased diameter portion 119' to provide a shoulder 119" for being engaged by member 115. Rod 119 is locked in place by lock nut 89. When shaft 17 is driven clockwise for door-opening movement, spring 75 is further tensioned by shifting of seat 95 until said stop is engaged.

Module version 77D (FIG. 14) similarly provides single-acting, right-hand operation. Rod 103 is interengaged with the rack gear by a longer tubular member 121 having an inwardly enlarged outer portion 121' peripherally engaging rod 103, which is provided with member 105 as in versions 77C and 77D. Rightward shifting of the rack gear will push rod 103 toward the outer end of the module housing portion 71*b*. To provide an adjustable stop, a long rod 123 is threaded into base 85' but has an decreased diameter portion 123' to provide a shoulder 123" for being engaged by member 105, and so limiting driven movement of the rack gear with corresponding clockwise rotation of shaft 17. Rod 123 is locked in place by lock nut 89.

Operator A is accordingly provided with a transmission providing speed reduction with corresponding mechanical advantage useful for heavy-duty, commercial applications. In the construction shown, an overall drive ratio of about 155:1 is provided. The overall ratio can be changed readily, however, by varying the ratio between pinion gear 35 and drive gear 37 so as, for example, to bring about a medium-duty operator with an overall drive ration of about 128:1, in which case it is preferred to provide in spring modules pretensioning of less than about 300 lb, and a spring rate of less than 100 lb/in.

Operators configured in accordance with the invention provide automatic operation, as is seen, for normal left hand swing (with right hand panic opening), normal right hand swing (with left hand panic opening), and double-acting, two-way operation (also with panic opening).

Figure 3:
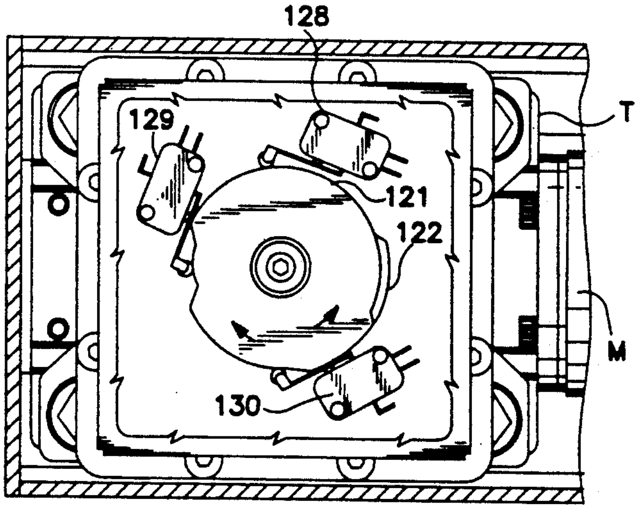
FIG. 3 is top plan view of another version of the operator in partial section, which depicts certain control features common with the first version, and thus jointly to be considered with Figures relating to the first version.
Figure 15:
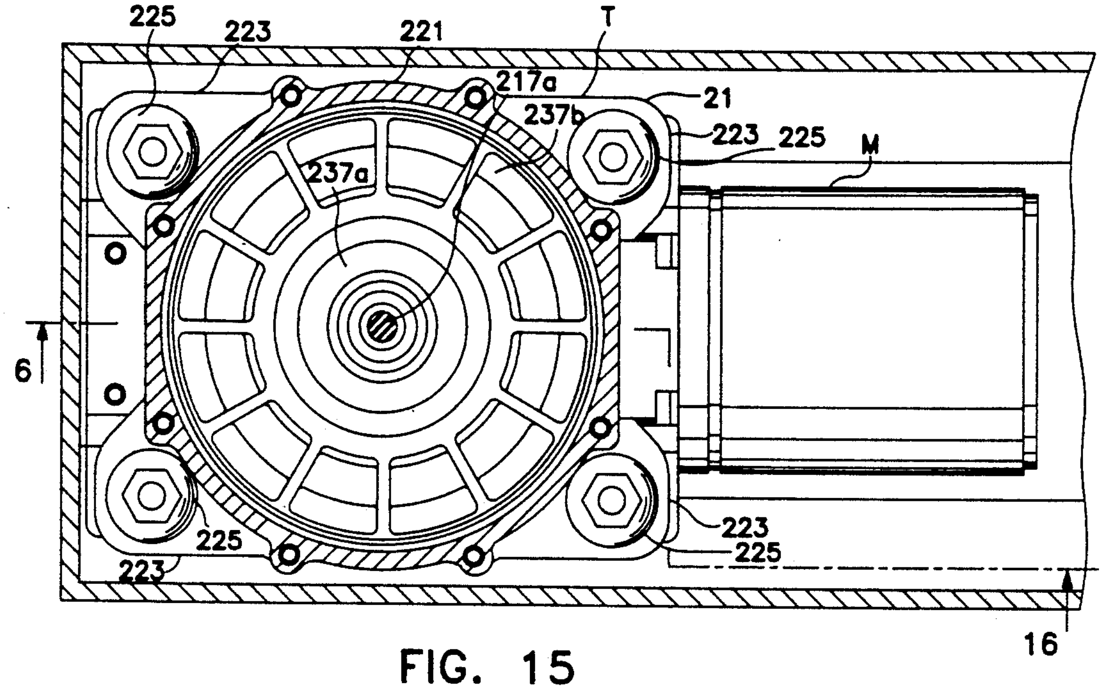
FIG. 15 is a top plan view of the second version, namely a second embodiment of the invention in the form of a domestic-type operator, as taken in partial section through a housing for the operator.
Figure 16:
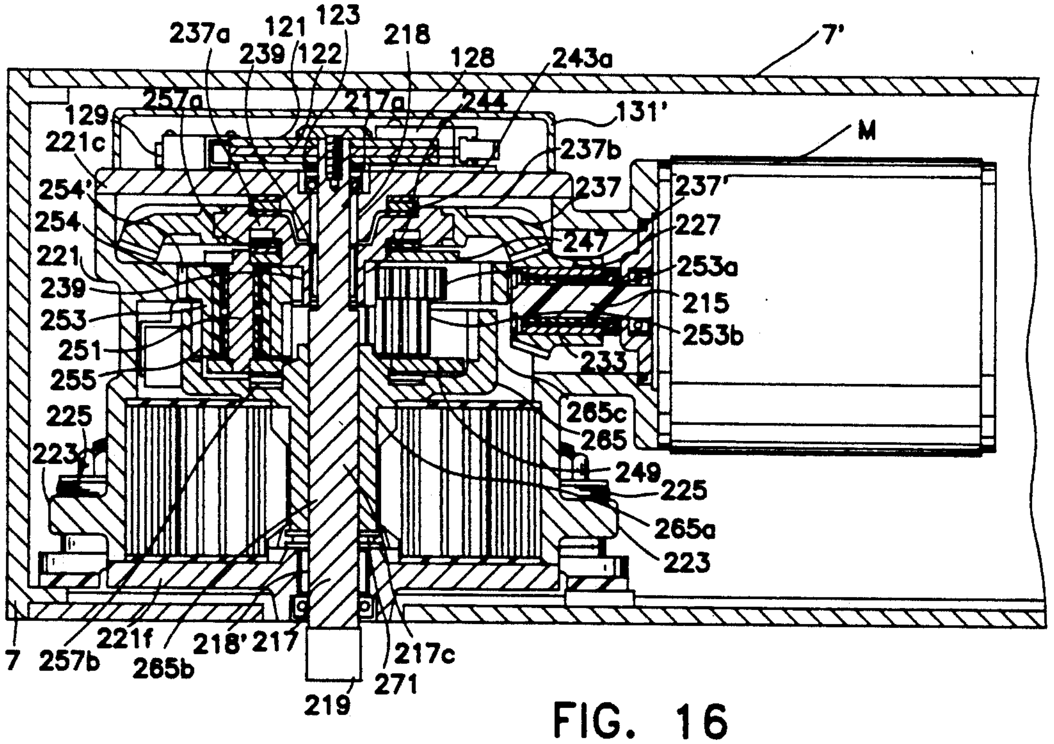
FIG. 16 is a vertical longitudinal sectional view taken along line 16—16 of FIG. 15.

Referring to FIGS. 3, 15 and 16, reference character B generally designates a lighter-weight, highly compact version of an epicyclic door operator of the invention, as particularly advantageous for domestic use. M indicates a speed variable direct current, permanent magnet motor with its output shaft 215 driven in response to control 11, as in FIG. 1, for automatic opening door 3 in a domestic or other light commercial use installation. As the operator is normally installed, motor shaft 215 is horizontal.

Transmission T includes a metal case 221 for compactly housing mechanism in accordance with the new design for speed-reduction coupling of door shaft 13 to motor shaft 215 with 90°, intersecting relationship between the axes of rotation of operator output shaft 217 and motor drive shaft 215. Transmission case 221 has at its lower end projections 223, serving as means for attachment of flexible rubber grommet shock mounts 225 for case isolation.

Operator shaft 217 is journalled at its upper and lower ends by bearings 218, 218' carried respectively by the transmission case cover 21*c* and floor 21*f*.

A miter gear 227 carried and driven by motor shaft 15 is in mesh with a drive gear 237, for directly driven relationship, with their axes in mutually perpendicular relationship. Miter gear 227 is connected to motor shaft 215 by an overdrive, one-way clutch 33, providing for use of the operator for single-acting operation.

It is to be appreciated that the axes of output shaft 217 and motor shaft 215 are coplanar and in 90°, intersecting relationship. Consequently, motor M is not laterally offset.

Both gears 227 and 237 preferably are formed by being molded of synthetic resin material of commercially available type used for comparable components of version A. Drive gear 237 is of two-part configuration like drive gear 37 of version A, including a metal hub portion 237*a* which is journalled by a needle bearing 239 about an upper, reduced diameter portion 217*a* of the operator output shaft about which the drive gear hub 237*a*; and between the drive gear and the corresponding, proximate portion 241 of transmission case 21 there is an upper needle thrust bearing 243. The outer, peripheral portion 237*b* carries at its outer periphery teeth 237' which are set at a bevel relationship for meshing with pinion gear 237. Portion 37*b* is formed in place upon hub portion 37*a* to maintain an integral relation therewith.

Hub portion 237*a* of the drive gear defines, and thus carries, at its lower end a sun pinion gear 244 independently rotatable about operator shaft portion 217*a*, being journalled by a needle bearing 239. Sun pinion gear 239 is in mesh with planet gears of a planetary cage assembly assembly like that designated generally 45, and shown in FIGS. 9*a*, 9*b* and 10. The planetary cage assembly is comprised of a planet assembly top plate 247, a planet assembly bottom plate 249 and three planet gear shafts 251 carried in equally spaced relationship, upon the same radius, between the upper and lower plates 247, 249. Carried on such shafts are three identical planet gears 253, as carried by the planet gear shafts for epicyclic movement about the operator output shaft 217 independently of the output shaft, have identical configuration. Each planet gear 253 has a first portion 253*a* in mesh with the sun pinion gear 239, and a second portion 253*b* of lesser diameter. The planet gears are journalled on their respective shafts 251 by needle bearings 255, and upper and lower needle thrust bearing 257*a*, 257*b*, respectively, for extremely low-friction relationship with the planet assembly upper and lower plates.

Each planet gear upper portion 253*a* of each planet gear is also in mesh with teeth 254' formed internally of a boss 254 of annular configuration, this boss being defined internally of transmission 221, and so effectively constituting a ring gear formed as an integral part of the transmission case. Rotation of each sun pinion gear causes the planet gear not only to turn about its respective axis defined by each planet gear shaft 251 but also to revolve with epicyclic movement about the axis of operator output shaft 217.

Output shaft 217 is provided in its lower extremity with a central portion 217*c* for thus being engaged by and receiving a moving ring gear 265 including a hub 265*a* having a central recess 265*b* fitted to output shaft splined portion 217*c*. An upstanding, annular rim 265*c* is provided along its inner periphery with teeth 267*d* for meshing with the lower part 253*b* of each of the planet gears. As in version A, epicyclic movement of the planet gears causes driving engagement of ring gear 265 with corresponding rotation of output shaft 217.

Said hub 265*a* of moving ring gear 265 is formed to provide an engagement recess 265*r* for receiving a radially inwardly engagement tab 276*t* of a preloaded, coiled leaf spring 276 for providing means for resiliently storing energy to provide a restorative force to operator output shaft 217 upon its rotation in the driven direction for door movement, it being desired to store energy in a spring for providing a restorative force to back-drive shaft 217 in the opposite direction, as for closing the door. Rotation of moving ring gear 265 and output shaft 217 will cause the pretensioned spring 276 to be further tensioned by being wound within the case, to which the outer end of the spring is suitably fixed.

Features as used for version A are also provided for back check control input and for control response in the event of so-called panic operation, namely above-described cam plates 121, 122, 123 (secured by a screw 125 and associated clamping washer 126), as well as the previously described microswitches 128, 129 and 130 (FIG. 3) as by the cam plates for back-check detection and for responding to movement of the door to its panic position. Specific disposition of adjustment of the cam plates and mode of operation, being known, is not described herein. A suitable cover 131' encloses these components.

Operation of version A accordingly is understood from a consideration of the components, with motor M causing operating shaft 217 to be driven with speed reduction by transmission T of, as preferred, about 125:1 with corresponding mechanical advantage useful for driving a domestic door of, for example, not more than 100 lb. For such operation spring 276 may have a preload of about 220–240 lb.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

Accordingly, the invention comprehends a door operator for use with swing-mounted doors comprising a prime mover, a door-driving operator output shaft, and means for coupling the operator output shaft to the door to be operated thereby. The operator output shaft is rotatable about a vertical axis for corresponding movement of the door, the prime mover having a drive shaft and being controllably energized for rotation of the prime mover drive shaft. A transmission is provided for speed reduction coupling of the prime mover drive shaft to the operator output shaft with substantially right-angled relationship between the axes of rotation of the operator output shaft and motor drive shaft. The operator includes a transmission housing for components of the transmission, and means for mounting of the transmission housing and operator within structure associated with the door. The transmission comprises a drive gear, first gear means for coupling the motor drive shaft to the drive gear, the drive gear being in coaxial relation with the operator output shaft but independently rotatable thereabout, and sun-and-planet gear means coaxial with the operator shaft including planet gears driven for epicyclic movement about the axis of the operator output shaft, for providing speed reduction coupling of the drive gear to the output shaft. The sun-and-planet gear means comprises a sun pinion gear carried by the drive gear in coaxial relation with the operator output shaft but independently rotatable thereabout, a planetary cage assembly comprising a plurality of planet gears, and cage means for carrying the planet gears in planetary relationship about the operator output shaft but independently rotatable thereabout with epicyclic movement. The cage means is rotatable but unjournalled about the operator output shaft, permitting both forward driving transfer of power from the prime mover to the output shaft and back driving from the output shaft to the drive mover. The operating shaft extends axially through the entirety of the transmission housing for extension from opposite portions thereof. The operator includes means operatively associated with the operator output shaft for resiliently coupling restorative force to the operator output shaft upon rotation thereof in at least one direction.

What is claimed is:

1. A door operator for use with swing-mounted doors comprising a prime mover, a door-driving operator output shaft, means for coupling the operator output shaft to the door to be operated thereby, with the operator output shaft rotatable about a vertical axis for corresponding movement of the door, the prime mover having a drive shaft and being controllably energized for rotation of the prime mover drive shaft, a transmission for speed reduction coupling of the prime mover drive shaft to the operator output shaft with substantially right-angled relationship between the axes of rotation of the operator output shaft and motor drive shaft, a transmission housing for components of the transmission, means for mounting of the transmission housing and operator within structure associated with the door, the transmission comprising a drive gear, first gear means for coupling the motor drive shaft to the drive gear, the drive gear being in coaxial relation with the operator output shaft but independently rotatable thereabout, and sun-and-planet gear means coaxial with the operator shaft including planet gears driven for epicyclic movement about the axis of the operator output shaft, for providing speed reduction coupling of the drive gear to the output shaft, the sun-and-planet gear means comprising a sun pinion gear carried by the drive gear in coaxial relation with the operator output shaft but independently rotatable thereabout, a planetary cage assembly comprising a plurality of planet gears, and cage means for carrying the planet gears in planetary relationship about the operator output shaft but independently rotatable thereabout with epicyclic movement, the cage means being rotatable but unjournalled about the operator output shaft, the cage assembly permitting both forward driving transfer of power from the prime mover to the output shaft, and back driving from the output shaft to the prime mover, the operating shaft extending axially through the entirety of the transmission housing for extension from opposite portions thereof, and means operatively associated with the operator output shaft for resiliently coupling restorative force to the operator output shaft upon rotation thereof in at least one direction.

2. A door operator as set forth in claim 1 wherein the cage means for carrying the planet gears in planetary relationship comprises a planet assembly including a bottom plate and a top plate, and planet gear shafts extending between the bottom and top plates, the bottom plate and top plate each having a central opening through which the axis of the operating shaft extends, the bottom plate and top plate each rotatable about said axis without journalled relation.

3. A door operator as set forth in claim 1 wherein the planet gears have first and second portions, a first portion of each of the planet gears being in mesh with the sun pinion gear, the transmission further comprising a non-rotatable ring gear in coaxial relation with the operator output shaft, the ring gear having teeth in mesh with the first portion of each of the planet gears, whereby rotation of the sun pinion gear causes the planet gears each to rotate not only upon its respective axis but also to revolve with epicyclic movement about the operator output axis.

4. A door operator as set forth in claim 3 wherein the ring gear is a fixed ring gear carried by the transmission, the ring gear including teeth on an inside diameter thereof in mesh with the first portion of each of the planet gears, the first portion of each of the planet gears being larger in diameter than the second portion of each of the planet gears.

5. A door operator as set forth in claim 4 wherein the transmission further comprises a pinion gear assembly including a moving ring gear in mesh with the second portion of each of the planet gears, whereby epicyclic movement of the planet gears will provide driving engagement of the moving ring gear, and means coupling the moving ring gear in rotationably fixed relation to the operator output shaft for driving engagement thereof.

6. A door operator as set forth in claim 5 wherein the moving ring gear has a first portion carrying teeth on an inside diameter thereof in mesh with the second portion of each of the planet gears, and a second portion fitted to and engaging the operator output shaft for driving it.

7. A door operator as set forth in claim 1 wherein the prime mover is an variable-speed electric motor having a motor drive shaft, the first gear means for coupling the motor drive shaft to the drive gear comprising a miter gear connected to the motor drive shaft, the drive gear having a miter portion in mesh with the miter gear.

8. A door operator as set forth in claim 7 wherein the miter gear and the drive gear miter portion are formed of synthetic resin material.

9. A door operator as set forth in claim 1 wherein the prime mover is a variable-speed electric motor having a motor drive shaft, the first gear means for coupling the motor drive shaft to the drive gear comprising a miter gear, a second miter gear carried by a miter gear shaft in 90° relation to the motor drive shaft, a pinion gear carried by the second miter gear, the pinion gear being in mesh with a peripheral portion of the drive gear.

10. A door operator as set forth in claim 9 wherein the miter gear shaft and motor drive shaft are in coplanar, intersecting relation but are noncoplanar with the operator output shaft, whereby the motor drive shaft is offset with respect to the operator output shaft.

11. A door operator as set forth in claim 9 wherein the first and second miter gears, the pinion gear and the drive gear peripheral portion are formed of synthetic resin material.

12. A door operator as set forth in claim 1 wherein the means for resiliently coupling restorative force to the operator output shaft comprises an output shaft pinion rotated by the operator output shaft and a rack gear having teeth in mesh with the output shaft pinion for driving engagement of the rack gear to cause longitudinal shifting of the rack gear upon rotation of the operator output shaft, a pretensioned spring, and means interconnecting at least one end of the spring with the rack gear for being further tensioned by the longitudinal shifting of the rack gear caused by driven rotation of the operator output shaft.

13. A door operator as set forth in claim 12 further comprising a spring assembly including a spring housing for the spring, carried by the transmission housing, the spring being of coiled compression type for being further tensioned by compression on an axis defined by the spring housing.

14. A door operator as set forth in claim 13 wherein the spring housing includes stop means for limiting and adjusting the extent of longitudinal shifting of the rack gear to determine limits of door movement.

15. A door operator as set forth in claim 1 wherein the means for resiliently coupling restorative force to the operator output shaft comprises a coiled spring surrounding the operator output shaft and operatively interengaging the operator output shaft and the transmission housing for being further tensioned by driven rotation of the operator output shaft.

16. A door operator as set forth in claim 1 wherein the means for resiliently coupling restorative force to the operator output shaft comprises an output shaft pinion rotated by the operator output shaft and a rack gear having teeth in mesh with the output shaft pinion for driving engagement of the rack gear to cause longitudinal shifting of a rack gear upon rotation of the operator output shaft, a spring assembly including a pretensioned spring and including a housing for being further tensioned by compression on an axis defined by the spring housing, and means interconnecting at least one end of the spring with the rack gear for being further tensioned by the longitudinal shifting of the rack gear caused by driven rotation of the operator output shaft, the spring housing including stop means for limiting and adjusting the extent of longitudinal shifting of the rack gear to determine limits of door movement.

17. A door operator as set forth in claim 1 wherein the output shaft extends from a door-proximate portion of the transmission housing and includes an extension which extends from a door-remote portion to the transmission housing for control purposes, the transmission configuration being such as to axially receive the output shaft extension for rotation thereof with the output shaft.

18. A door operator for use with swing-mounted doors comprising an electric motor having a motor drive shaft, a door-driving operator output shaft, means for coupling the operator output shaft to the door to be operated thereby, with the operator output shaft rotatable about a vertical axis for corresponding movement of the door, the motor being controllably energized for controlling rotation of the motor drive shaft, a transmission for speed reduction coupling of the motor drive shaft to the operator output shaft with 90° relationship between the axes of rotation of the operator output shaft and motor drive shaft, a transmission housing for components of the transmission, means for mounting of the transmission housing and operator within structures associated with the door, the transmission comprising a drive gear, first gear means for coupling the motor drive shaft to the drive gear, the drive gear being in coaxial relation with the operator output shaft but independently rotatable thereabout, a sun pinion gear carried by the drive gear in coaxial relation with the operator output shaft but independently rotatable thereabout, a planetary cage assembly comprising a plurality of planet gears and cage means for carrying the planet gears in planetary relationship about the operator output shaft but independently rotatable thereabout with epicyclic movement, with a first portion of each of the planet gears in mesh with the sun pinion gear, the cage means being rotatable but unjournalled about the operator output shaft, the cage assembly permitting both forward driving transfer of power from the prime mover to the output shaft, and back driving from the output shaft to the prime mover, the operating shaft extending axially through the entirety of the transmission housing for extension from opposite portions thereof, and means operatively associated with the operator output shaft for resiliently coupling restorative force to the operator output shaft upon rotation thereof in at least one direction.

19. A door operator as set forth in claim 18 wherein the means for resiliently coupling restorative force to the operator output shaft comprises a coiled spring surrounding the operator output shaft and operatively interengaging the operator output shaft and the transmission housing for being further tensioned by driven rotation of the operator output shaft.

20. A door operator as set forth in claim 18 wherein the first gear means for coupling the motor drive shaft to the drive gear comprises a miter gear connected to the motor drive shaft, the drive gear having a miter portion in mesh with the miter gear, the miter gear and the drive gear miter portion being formed of synthetic resin material.

21. A door operator as set forth in claim 20 wherein the miter gear shaft and motor drive shaft are in coplanar, intersecting relation but are noncoplanar with the operator output shaft, whereby the motor drive shaft is offset with respect to the operator output shaft,

22. A door operator as set forth in claim 20 wherein the motor drive shaft comprises means for universally adapting the motor shaft selectively for either direct drive coupling or one-way coupling to the miter gear.

23. A door operator as set forth in claim 18 wherein the first gear means for coupling the motor drive shaft to the drive gear comprises a miter gear, a second miter gear carried by a miter gear shaft in 90° relation to the motor drive shaft, a pinion gear carried by the second miter gear, the pinion gear being in mesh with a peripheral portion of the drive gear, the first and second miter gears, the pinion gear and the drive gear peripheral portion being formed of synthetic resin material.

24. A door operator as set forth in claim 18 wherein the operator output shaft includes an extension, cam means carried by the extension exteriorly of the transmission housing, and switch means operated by the cam means for back check sensing and control sensing in the event of panic operation of the door.

25. A door operator as set forth in claim 18 wherein the output shaft extends form a door-proximate portion of the transmission housing and includes an extension which extends from a door-remote portion of the transmission housing for control purposes, the transmission configuration being such as to axially receive the output shaft extension for rotation thereof with the output shaft.

26. In a door operator for use with swing-mounted doors including a prime mover, a door-driving operator output shaft, means for coupling the operator output shaft to the door to be operated thereby, the operator output shaft being rotatable about a vertical axis for corresponding movement of the door, the prime mover having a drive shaft and being controllably energized for rotation of the prime mover drive shaft, a transmission for speed reduction coupling of the prime mover drive shaft to the operator output shaft, a transmission housing for components of the transmission, and means for mounting of the transmission housing and operator within structure associated with the door, the transmission including a drive gear, first gear means for coupling the motor drive shaft to the drive gear, the drive gear being in coaxial relation with the operator output shaft but independently rotatable thereabout, and sun-and-planet gear means coaxial with the operator shaft including planet gears driven for epicyclic movement about the axis of the operator output shaft, for providing speed reduction coupling of the drive gear to the output shaft, the sun-and-planet gear means comprising a sun pinion gear carried by the drive gear in coaxial relation with the operator output shaft but independently rotatable thereabout, a planetary cage assembly comprising a plurality of planet gears, and cage means for carrying the planet gears in planetary relationship about the operator output shaft but independently rotatable thereabout with epicyclic movement, and means operatively associated with the operator output shaft for resiliently coupling restorative force to the operator output shaft upon rotation thereof in at least one direction, the improvement comprising the cage means being rotatable but unjournalled about the operator output shaft, the cage assembly permitting both forward driving transfer of power from the prime mover to the output shaft, and back driving from the output shaft to the drive mover, the operating shaft extending axially through the entirety of the transmission housing for extension from opposite portions thereof.

27. In a door operator as set forth in claim 26, the cage means for carrying the planet gears in planetary relationship comprising a planet assembly including a bottom plate and a top plate, and planet gear shafts extending between the bottom and top plates, the bottom plate and top plate each having a central opening through which the axis of the operating shaft extends, the bottom plate and top plate each rotatable about said axis without journalled relation.

28. In a door operator as set forth in claim 26, the output shaft extending from a door-proximate portion of the transmission housing and including an extension which extends from a door-remote portion of the transmission housing for control purposes, the transmission configuration being such as to axially receive the output shaft extension for rotation thereof with the output shaft.

29. In a door operator for use with swing-mounted doors including an electric motor having a motor drive shaft, a door-driving operator output shaft, means for coupling the operator output shaft to the door to be operated thereby, with the operator output shaft rotatable about a vertical axis for corresponding movement of the door, the motor being controllably energized for controlling rotation of the motor drive shaft, a transmission for speed reduction coupling of the motor drive shaft to the operator output shaft, a transmission housing for components of the transmission, means for mounting of the transmission housing and operator within structure associated with the door, the transmission including a drive gear, first gear means for coupling the motor drive shaft to the drive gear, the drive gear being in coaxial relation with the operator output shaft but independently rotatable thereabout, a sun pinion gear carried by the drive gear in coaxial relation with the operator output shaft but independently rotatable thereabout, means operatively associated with the operator output shaft for resiliently coupling restorative force to the operator output shaft upon rotation thereof in at least one direction, and a planetary cage assembly comprising a plurality of planet gears and cage means for carrying the planet gears in planetary relationship about the operator output shaft but independently rotatable thereabout with epicyclic movement, with a first portion of each of the planet gears in mesh with the sun pinion gear, the improvement comprising the cage means being rotatable but unjournalled about the operator output shaft, the cage assembly permitting both forward driving transfer of power from the prime mover to the output shaft, and back driving from the output shaft to the prime mover, the operating shaft extending axially through the entirety of the transmission housing for extension from opposite portions thereof.

30. In a door operator as set forth in claim 29, the output shaft extending from a door-proximate portion of the transmission housing and including an extension which extends from a door-remote portion of the transmission housing for control purposes, the transmission configuration being such as to axially receive the output shaft extension for rotation thereof with the output shaft.

* * * * *

UNITED STATES PATENT AND TRADEMARK OFFICE

CERTIFICATE OF CORRECTION

PATENT NO. : 5,221,239

DATED : June 22, 1993

INVENTOR(S) : John C. Catlett

It is certified that error appears in the above-identified patent and that said Letters Patent is hereby corrected as shown below:

Column 15, line 38, change "a" to read --the--;

Column 15, line 40, after "for" insert --the spring, the spring being of coiled compression type for--;

Column 17, line 43, change "drive" to read --prime--.

Signed and Sealed this

Twenty-ninth Day of March, 1994

*Attest:*

Bruce Lehman

BRUCE LEHMAN

*Attesting Officer* *Commissioner of Patents and Trademarks*